United States Patent Office 3,790,627
Patented Feb. 5, 1974

3,790,627
PROCESS FOR THE PRODUCTION OF TRICHLORO-METHANETHIOSULFENYL CHLORIDE
Helmut Magerlein, Erlenbach, Gerhard Meyer, Obernburg, and Hans-Dieter Rupp, Erlenbach, Germany, assignors to Glanzstoff AG, Wuppertal, Germany
No Drawing. Filed June 29, 1970, Ser. No. 50,919
Claims priority, application West Germany, July 1, 1969,
P 19 33 242.4
Int. Cl. C07c *149/16*
U.S. Cl. 260—543 H
9 Claims

ABSTRACT OF THE DISCLOSURE

A process for the preparation of trichloromethanethiosulfenyl chloride by reacting sulfur with trichloromethanesulfenyl chloride at an elevated temperature on activated carbon, preferably with less than the stoichiometric amount of sulfur and/or in the presence of sulfur chloride to suppress side reactions. The product of this process is a valuable intermediate known for use especially in the production of pesticides.

---

It was previously known that trichloromethanethiosulfenyl chloride can be prepared by reacting trichloromethanesulfenyl chloride with sulfur in the presence of triethylphosphate as a catalyst at temperatures of 140° C. to 150° C. (British Pat. No. 962,021). The rate of reaction in this process, however, is very low. Another disadvantage of this known process is its low yield.

A process for the preparation of trichloromethanethiosulfenyl chloride from thiophosgene and sulfur dichloride in the presence of iodine as a catalyst has also been described (East German patent specification No. 50,597). The yields in this process are also low, lying between about 50 and 53% of theory. Hexachlorodimethyltrisulfide is obtained in this process as a by-product as is trichloromethanesulfenyl chloride which is formed by a chlorinating decomposition of trichloromethanethiosulfenyl chloride. Since thiophosgene is a very inaccessible raw material, this process has no particular technological significance.

In another known process, trichloromethanethiosulfenyl chloride is prepared by the chlorinative decomposition of hexachlorodimethyltrisulfide at temperatures of −10° C. to 30° C. (East German patent specification No. 50,596). Hexachlorodimethyl trisulfide is in turn prepared by reacting trichloromethanesulfenyl chloride with hydrogen sulfide in the presence of a catalyst. The combination of these two steps provides a continuous or overall two-step process for converting trichloromethanesulfenyl chloride into trichloromethanethiosulfenyl chloride. The yield is approximately 75%.

Another known process is one in which trichloromethanethiosulfenyl chloride is prepared directly by the chlorination of carbon disulfide with chlorine or iodochlorides (East German patent specification No. 55,944). However, this process requires 15 to 20% of iodine as catalyst, and moreover the trichloromethanethiosulfenyl chloride yield is only about 15 to 30%.

It is an object of the present invention to provide a process for the production of trichloromethanethiosulfenyl chloride in improved yields directly from trichloromethanesulfenyl chloride. Another object of the invention is to avoid high catalyst costs in this process while also suppressing the formation of by-products to a substantial extent, i.e. so as to more selectively produce the desired trichloromethanethiosulfenyl chloride. These and other objects and advantages of the invention will become more apparent upon consideration of the following detailed disclosure.

In accordance with the invention, it has now been found that an improved production of trichloromethanethiosulfenyl chloride can be achieved by reacting sulfur and trichloromethanesulfenyl chloride at an elevated temperature in contact with activated carbon, especially an activated carbon which is substantially free of iron and which is employed in granulated or particulate form.

The formation of trichloromethanethiosulfenyl chloride from trichloromethane sulfenyl chloride and sulfur generally proceeds according to Equation 1:

$$CCl_3SCl + S \rightarrow CCl_3SSCl \qquad (1)$$

In addition to this main reaction, however, investigation has shown that several side reactions may occur. Thus, bis(trichloromethyl)disulfide is formed according to Equation 2 while bis(trichloromethyl)trisulfide is formed according to Equation 3:

$$2CCl_3SCl + 2S \rightarrow CCl_3SSCCl_3 + S_2Cl_2 \qquad (2)$$

$$2CCl_3SCl + 3S \rightarrow CCl_3SSSCCl_3 + S_2Cl_2 \qquad (3)$$

In both instances, sulfur chloride is formed as an additional reaction product. Moreover, carbon disulfide and sulfur chloride are formed from trichloromethanesulfenyl chloride and sulfur according to Equation 4, and carbon tetrachloride, carbon disulfide and sulfur chloride result as by-products according to Equation 5:

$$CCl_3SCl + 5S \rightarrow CS_2 + 2S_2Cl_2 \qquad (4)$$

$$4CCl_3SCl + 2S \rightarrow 3CCl_4 + CS_2 + 2S_2Cl_2 \qquad (5)$$

The reaction between trichloromethanesulfenyl chloride and sulfur proceeds extremely rapidly in the presence of activated carbon and results in surprisingly good yields in spite of competing side reactions. In this respect, the activated carbon can be considered as a catalyst or promoter of the reaction and is distinguished by its relatively low cost and long life.

It has been further found in accordance with the invention that the formation of the by-products bis(trichloromethyl)disulfide according to Equation 2, of bis(trichloromethyl)trisulfide according to Equation 3, of carbon disulfide according to Equation 4 or 5 and of carbon tetrachloride according to Equation 5 can be substantially suppressed by carrying out the reaction in the presence of sulfur chloride ($S_2Cl_2$). The sulfur chloride is not used up in the reaction and can be isolated almost quantitatively from the reaction mixture and used again. Any losses of sulfur chloride which occur when working up the reaction mixture are easily replaced by the sulfur chloride formed as a by-product according to Equations 2 to 5. The amount of sulfur chloride in the reaction, i.e. from its inception, should be sufficient to cause a substantial suppression or reduction in the formation of the by-products, e.g. at least about 10 molar percent with reference to the trichloromethanesulfenyl chloride to be reacted.

The highest yields of trichloromethanethiosulfenyl chloride are obtained when the sulfur chloride and trichloromethanesulfenyl chloride are introduced into the reaction in a molar ratio of about 0.5:1 to 4:1, preferably in a molar ratio of approximately 3:1.

On the other hand, it has also been found that the formation of the above mentioned by-products can be substantially suppressed by using less than a stoichiometric equivalent amount of sulfur. In this case, the highest yields of trichloromethanethiosulfenyl chloride are obtained when sulfur and trichloromethanesulfenyl chloride are brought into the reaction in a molar ratio of about 0.3:1 to 0.75:1, preferably in a molar ratio of approximately 0.5:1.

The reaction temperature also influences the selectivity of the reaction between trichloromethanesulfenyl chloride and sulfur. With increasing reaction temperature, the yield of trichloromethanethiosulfenyl chloride at first rises, passes through a maximum in the range of about 90° C. to 120° C. and then falls again at higher temperatures. It is therefore advantageous to carry out the reaction at reaction temperatures within this range and generally above 75° C. but below about 140° C. At the most advantageous molar ratios of sulfur:trichloromethanesulfenyl chloride:sulfur chloride, i.e. from about 0.3:1:0.5 to 0.75:1:4 and preferably on the order of 0.5:1:3, the optimum reaction temperature lies in the range of 100° C. to 110° C. The process according to the invention is therefore most desirably carried out within this approximate range of 100–110° C.

If the most advantageous conditions are employed as described, then one-half of the trichloromethanesulfenyl chloride and all of the sulfur are reacted.

The reaction mixture obtained can be easily worked up by distillation under vacuum. For example, the first fraction obtained at 30° C./10 mm. Hg consists of a mixture of sulfur chloride and excess trichloromethanesulfenyl chloride which can be returned to the reaction after first replacing the amount of trichloromethanesulfenyl chloride and sulfur which have undergone reaction. The next fraction which distils over at 79° C./10 mm. Hg, consists of a substantially pure trichloromethanethiosulfenyl chloride. The distillation residue consists of a mixture of small amounts of bis(trichloromethyl)disulfide and bis(trichloromethyl)trisulfide.

Bis(trichloromethyl)disulfide and trisulfide are not valueless waste products. For example, if not required for other useful purposes, they may be chlorinated by known processes and then also used as the initial reactant for the preparation of trichloromethanethiosulfenyl chloride. Thus, an overall process can be provided which almost completely eliminates by-products, especially when carried out continuously and by recycling to the main reaction those by-products which might otherwise be wasted.

It is particularly advantageous to use a substantially clear solution of the sulfur in trichloromethanesulfenyl chloride, especially in this reactant and sulfur chloride. Since only limited quantities of sulfur are soluble in a mixture of trichloromethanesulfenyl chloride and sulfur chloride at room temperature, the reaction solution is desirably preheated before it is introduced into a suitable reaction tube or other reaction vessel which is filled with the activated carbon. The temperature required in order to obtain a clear solution depends on the sulfur content of the initial reaction solution.

The process according to the invention may be carried out in various ways both in batches and continuously. The reaction is advantageously carried out in an elongated reaction tube which is at least partly filled with a granulated activated carbon, e.g. a solution of sulfur in trichloromethanesulfenyl chloride and sulfur chloride being introduced into this tube and a temperature of 90° C. to 120° C., preferably 100° C. to 110° C., being maintained in the reaction zone. According to a preferred embodiment of the process of this invention, a solution of sulfur in trichloromethanesulfenyl chloride and sulfur chloride in the molar ratio of 0.3:1.0:0.5 to 0.75:1.0:4.0, preferably 0.5:1.0:3.0, is introduced into the upper part of a reaction tube filled with granulated activated carbon as a fixed bed, and the reaction mixture which forms is continuously removed from the lower end of the reaction tube and then worked up by distillation at reduced pressure.

The activated carbon employed for the process should be free from iron since iron has been found to promote the formation of carbon tetrachloride and carbon disulfide according to equations 4 and 5 above. Commercial activated carbon usually contains iron, but it can easily be purified for use in the process according to the invention. For this purpose, the activated carbon which contains iron is first extracted with dilute aqueous hydrochloric acid, then washed free from acid with water and finally dried. It is helpful to use those types of activated carbon which are substantially resistant to abrasion and have a particle size of approximately 2.5 to 4 mm. The activated carbon is readily obtainable in commercial form and can be prepared in accordance with known methods from a variety of carbonaceous substances, usually by treatment with an oxidizing gas to provide particles of very high surface area substantially free of residual hydrocarbons. The acid treatment described above will essentially eliminate iron as well as any other acid-soluble impurities so that the activated carbon consists essentially of an amorphous carbon. The vapor-adsorbent type of activated carbon is especially preferred, i.e. in the form of relatively large granules with a grain size of at least about 1 mm. and adapted to form a fixed bed. However, it is also feasible to use charcoal or other well-known forms of activated carbon.

It will be apparent, of course, that one should preferably select other reaction conditions which will avoid the presence of iron, i.e. by avoiding the use of iron or iron-containing apparatus in the reaction zone. Thus, in order to make certain that side-reactions are suppressed to the greatest possible extent, it is preferable to carry out the reaction in glass or glass-lined reactors or similar means for avoiding contact with iron as well as other metals which might exhibit an undesirable catalytic effect. Such precautions are easily observed, and in referring to a reaction in accordance with the invention in which the reaction mixture is essentially contacted with activated carbon, it will be understood that this mixture should be substantially free of contact from other catalytic substances and especially iron.

The starting materials trichloromethanesulfenyl chloride, sulfur and sulfur chloride should also be sufficiently purified as to be free from iron for the reasons mentioned above. Both trichloromethanesulfenyl chloride and sulfur chloride can be readily obtained by known processes. Only small amounts of sulfur chloride are required as an additive in the process of the invention when carried out continuously with the recovery and recycle of this particular compound.

The process according to the invention differs from known processes and is particularly distinguished in its high yield of the desired product. It is also distinguished by the fact that no expensive catalysts have to be employed or carefully regenerated. The activated carbon used in this process of the invention fully retains its activity even after long use in a continuous process or in successive batches.

The invention can be further illustrated in detail by the following example, it being understood that the process of the invention is not limited to the preferred conditions set forth in this example.

EXAMPLE

The apparatus required consists essentially of a 1,000 mm. long upright heatable double-walled reaction tube made of glass which is filled with 85 grams of granular activated carbon having a grain size of 2.5 mm., this activated carbon having been treated with dilute hydrochloric acid, washed with water and dried in order to ensure the removal of any iron content. This reaction tube is connected at its upper end to a heatable dropping funnel for feeding the initial reactants or preheated reaction mixture and is also connected at its lower end to a receiver which is adapted to be cooled and which serves to collect the reaction mixture.

A solution of 30.7% by weight of trichloromethanesulfenyl chloride, 2.6% by weight of sulfur and 66.7% by weight of sulfur chloride (molar ratio 1:0.5:3) was preheated to 110° C. in the funnel and poured dropwise at a rate of 50 ml./hour onto the upper end of the layer or bed of activated carbon charcoal while a temperature of 110° C. was maintained in the reaction tube over the entire bed of activated carbon. The reaction mixture leaving the lower end of the reaction tube was collected in the cooled receiver and worked up by distillation under reduced pressure as described above.

Samples of the reaction mixture obtained during the first hours of this process varied in composition owing to the different adsorptions of individual substances on the activated carbon. It was only after 3 to 5 hours continuous operation that the samples of the reaction mixture were all found to have the same composition.

100 grams of the reaction mixture collected as discrete samples after the process had been in operation for some time were separated by vacuum distillation. 67.7 grams of first runnings were distilled over at 30° C./10 mm. Hg and, as determined by gas chromatographic analysis, these first runnings consisted of 18.5% by weight of trichloromethanesulfenyl chloride (50% of the quantity introduced into the reaction) and 81.5% by weight of sulfur chloride. At 79° C./10 mm. Hg, 14.9 grams of trichloromethanethiosulfenyl chloride distilled over, representing a yield of 82% of theory based on the amount of reacted trichloromethanesulfenyl chloride and sulfur. The distillation residue (13.7 grams) consisted of 61.7% by weight of bis(trichloromethyl)disulfide and 38.3% by weight of bis(trichloromethyl)trisulfide, as determined by gas chromatographic analysis. These residual by-products can be easily chlorinated for subsequent conversion into trichloromethane thiosulfenyl chloride so as to further enhance the total yields obtained from the process according to the invention.

Similar high yields are obtained when working under the generally preferred conditions of the present invention, and it is quite significant that these high yields are obtained only with the use of activated carbon as the essential catalyst or promoter. Previously suggested catalysts do not offer such commercially advantageous results under any conditions, so that the present invention is believed to reside in the essentially presence of the activated carbon while variations can be made as to the selection of temperature, proportions, etc., consistent with the foregoing disclosure so as to achieve a significant improvement if not the illustrated optimum results. Moreover, the activated carbon when employed as a fixed bed does not require frequent regeneration and need not be separated from the products in a separate step, so that its use is very economical and permits a smooth continuous process with a minimum of attention or interruption. The desired trichloromethanethiosulfenyl chloride is obtained in substantially pure form so that further purification generally is not required for conventional use of this compound.

The invention is hereby claimed as follows:

1. A process for the production of trichloromethane thiosulfenyl chloride which comprises reacting sulfur and trichloromethanesulfenyl chloride in a molar ratio of about 0.3:1 to 0.75:1 at an elevated temperature of about 75° C. to 140° C. in contact with activated carbon which is substantially free of iron and in the presence of sulfur chloride ($S_2Cl_2$) in an amount such that the molar ratio of said sulfur chloride to trichloromethanesulfenyl chloride is about 0.5:1 to 4:1.

2. A process as claimed in claim 1 wherein the molar ratio of said sulfur chloride to trichloromethanesulfenyl chloride in said reaction is approximately 3:1.

3. A process as claimed in claim 1 wherein the molar ratio of sulfur:trichloromethanesulfenyl chloride in said reaction is approximately 0.5:1.

4. A process as claimed in claim 1 wherein said reaction is carried out at a temperature of about 90° C. to 120° C.

5. A process as claimed in claim 1 wherein said reaction is carried out at a temperature of about 100° C. to 110° C.

6. A process as claimed in claim 1 wherein said reaction is carried out by contacting a solution of sulfur in trichloromethanesulfenyl chloride with a granulated activated carbon at a temperature of about 90° C. to 120° C.

7. A process as claimed in claim 6 wherein said granulated activated carbon has a particle size of approximately 2.5 to 4 mm.

8. A process as claimed in claim 1 wherein the molar ratio of sulfur:trichloromethanesulfenyl chloride:sulfur chloride in said reaction is about 0.3:1:0.5 to 0.75:1:4.

9. A process as claimed in claim 1 wherein the molar ratio of sulfur:trichlorometanesulfenyl chloride:sulfur chloride in said reaction is approximately 0.5:1:3.

References Cited
FOREIGN PATENTS
55,944   5/1967   East Germany _____ 260—543

LORRAINE A. WEINBERGER, Primary Examiner

R. GERSTL, Assistant Examiner

U.S. Cl. X.R.

260—608